(12) United States Patent
Nakamura et al.

(10) Patent No.: US 11,993,320 B2
(45) Date of Patent: May 28, 2024

(54) SPOILER STRUCTURE

(71) Applicant: HONDA MOTOR CO., LTD., Tokyo (JP)

(72) Inventors: Yuki Nakamura, Wako (JP); Kei Ambo, Wako (JP); Kenichi Ando, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 294 days.

(21) Appl. No.: 17/668,875

(22) Filed: Feb. 10, 2022

(65) Prior Publication Data
US 2022/0258813 A1 Aug. 18, 2022

(30) Foreign Application Priority Data

Feb. 18, 2021 (JP) .................. 2021-024271

(51) Int. Cl.
*B62D 35/00* (2006.01)
*B62D 37/02* (2006.01)

(52) U.S. Cl.
CPC .......... *B62D 35/007* (2013.01); *B62D 37/02* (2013.01)

(58) Field of Classification Search
CPC ........ B62D 35/007; B62D 37/02; Y02T 10/82
See application file for complete search history.

(56) References Cited

U.S. PATENT DOCUMENTS

| | | | | |
|---|---|---|---|---|
| 4,674,788 A | * | 6/1987 | Ohmura | B62D 35/007 296/180.5 |
| 5,454,619 A | * | 10/1995 | Haraway, Jr. | B62D 37/02 296/180.1 |
| 6,193,302 B1 | * | 2/2001 | Won | B62D 37/02 296/180.1 |

(Continued)

FOREIGN PATENT DOCUMENTS

| | | |
|---|---|---|
| JP | S59-182474 U | 12/1984 |
| JP | S60-12380 A | 1/1985 |

(Continued)

OTHER PUBLICATIONS

Japanese Office Action received in corresponding Japanese application No. 2022-161895 dated Jul. 25, 2023 with English translation (8 pages).

(Continued)

*Primary Examiner* — Lori Lyjak
(74) *Attorney, Agent, or Firm* — Rankin, Hill & Clark LLP

(57) ABSTRACT

A spoiler structure includes a base portion that is attached to a vehicle body and a movable flow adjustment portion that is moved relative to the base portion from a front position on a vehicle front side to a rear position on a vehicle rear side via an intermediate position. A rear end of the movable flow adjustment portion is moved upward with movement of the movable flow adjustment portion from the front position to the intermediate position. The rear end of the movable flow adjustment portion is moved downward with movement of (Continued)

the movable flow adjustment portion from the intermediate position to the rear position. A height position of the rear end of the movable flow adjustment portion at the rear position is lower than a height position of the rear end of the movable flow adjustment portion at the front position.

8 Claims, 3 Drawing Sheets

(56) References Cited

U.S. PATENT DOCUMENTS

| | | | | |
|---|---|---|---|---|
| 10,099,730 | B1* | 10/2018 | Williams | B62D 37/02 |
| 2006/0043770 | A1* | 3/2006 | Preiss | B62D 35/007 |
| | | | | 296/180.1 |
| 2008/0301898 | A1* | 12/2008 | Katou | B60S 1/0458 |
| | | | | 15/250.201 |
| 2014/0084626 | A1* | 3/2014 | Hori | B62D 35/007 |
| | | | | 296/180.5 |
| 2015/0274222 | A1* | 10/2015 | Wolf | B62D 35/007 |
| | | | | 296/180.5 |
| 2015/0274223 | A1* | 10/2015 | Wolf | B62D 37/02 |
| | | | | 296/180.5 |
| 2018/0050741 | A1* | 2/2018 | Wolf | B62D 37/02 |
| 2019/0193533 | A1* | 6/2019 | Chiba | B60J 5/107 |
| 2021/0269102 | A1* | 9/2021 | Lindberg | B62D 37/02 |
| 2023/0014189 | A1* | 1/2023 | Mitchell | B62D 35/007 |

FOREIGN PATENT DOCUMENTS

| | | |
|---|---|---|
| JP | H06-305452 A | 11/1994 |
| JP | H08-2062 Y2 | 1/1996 |

OTHER PUBLICATIONS

Office Action received in corresponding Japanese application No. 2022-161895 dated Mar. 28, 2023 with English translation (4 pages).

\* cited by examiner (A)

(B)

(C)

SPOILER STRUCTURE

CROSS-REFERENCE TO RELATED APPLICATION

This application claims the benefit of foreign priority to Japanese Patent Application No. 2021-024271, filed on Feb. 18, 2021, which is incorporated by reference in its entirety.

TECHNICAL FIELD

The present invention relates to a spoiler structure.

BACKGROUND

A spoiler structure in which a rear end of an aileron corresponding to a rear spoiler is moved up and down from a normal position has been conventionally known (for example, JP S60-12380 A).

In the conventional spoiler structure as described above, there is no disclosure of rearward movement of the spoiler and it is impossible to increase the surface area of the rear spoiler and improve a flow adjustment effect. Accordingly, there is a room for further improvements.

An object of the present invention is to provide a spoiler structure that can increase the surface area of a spoiler and improve a flow adjustment effect.

SUMMARY

According to one aspect of the present invention, a spoiler structure includes: a base portion that is attached to a vehicle body; and a movable flow adjustment portion that is moved relative to the base portion from a front position on a vehicle front side to a rear position on a vehicle rear side via an intermediate position. Here, a rear end of the movable flow adjustment portion is moved upward with movement of the movable flow adjustment portion from the front position to the intermediate position. The rear end of the movable flow adjustment portion is moved downward with movement of the movable flow adjustment portion from the intermediate position to the rear position, and a height position of the rear end of the movable flow adjustment portion at the rear position is lower than a height position of the rear end of the movable flow adjustment portion at the front position.

BRIEF DESCRIPTION OF THE DRAWINGS

The drawings described herein are for illustration purposes only and are not intended to limit the scope of the present invention in any way.

DETAILED DESCRIPTION

Figure 1:
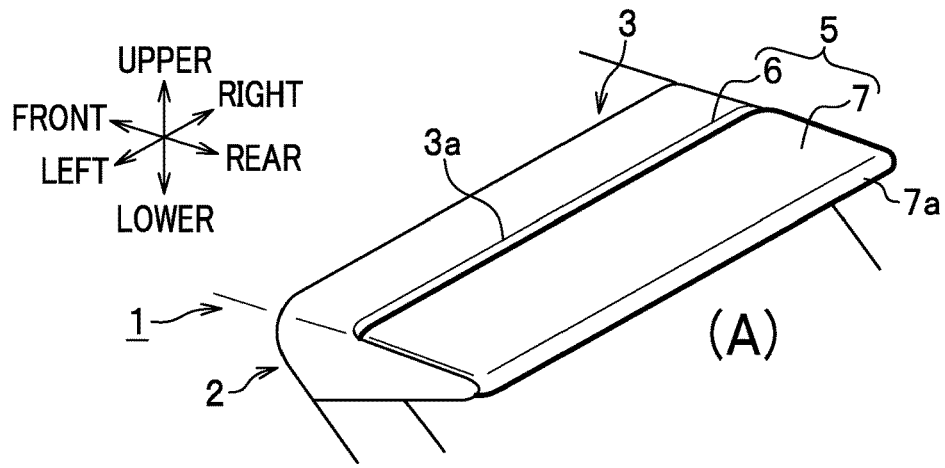
FIG. 1 is a perspective view of a spoiler structure according to one embodiment of the present invention, illustrating a state where a movable flow adjustment portion in a rear spoiler provided at a roof rear edge of a vehicle body is at a front position.

One embodiment of the present invention is described below with reference to the drawings as appropriate. The same components are denoted by the same reference numerals and duplicated description is omitted. Directions such as front, rear, left, right, upper, and lower are described basically, unless otherwise noted, based on corresponding directions as viewed from the driver. A "vehicle width direction" is synonymous with a "left-right direction".

A configuration of a spoiler structure according to this embodiment is described.

As illustrated in FIG. 1, in a vehicle 1 of this embodiment, a roof portion 3 is provided in an upper portion of a vehicle body 2. A rear spoiler 5 is attached across substantially the entire region of a rear edge 3a of the roof portion 3 in the vehicle width direction.

The rear spoiler 5 includes a base portion 6 attached to the vehicle body 2 and a movable flow adjustment portion 7. The movable flow adjustment portion 7 is movable relative to the base portion 6 from a front position (A) on the vehicle front side illustrated in FIG. 1 to a rear position (C) on the vehicle rear side illustrated in FIG. 3, via an intermediate position (B) illustrated in FIG. 2.

It should be noted that the intermediate position (B) is not limited to a position in the middle (center) of the front position (A) and the rear position (C). For example, a position where a rear end 7a of the movable flow adjustment portion 7 to be described later is moved upward may be set in front of the middle of the front position (A) and the rear position (C), behind the middle position, or the like, and the intermediate position (B) may be provided at any position between the front position (A) and the rear position (C).

Moreover, link mechanisms 8 (see FIG. 4) that move the movable flow adjustment portion 7 are provided between the base portion 6 and the movable flow adjustment portion 7. In this embodiment, a pair of left and right link mechanisms 8 are provided away from each other by a predetermined dimension in the vehicle width direction.

Figure 4:
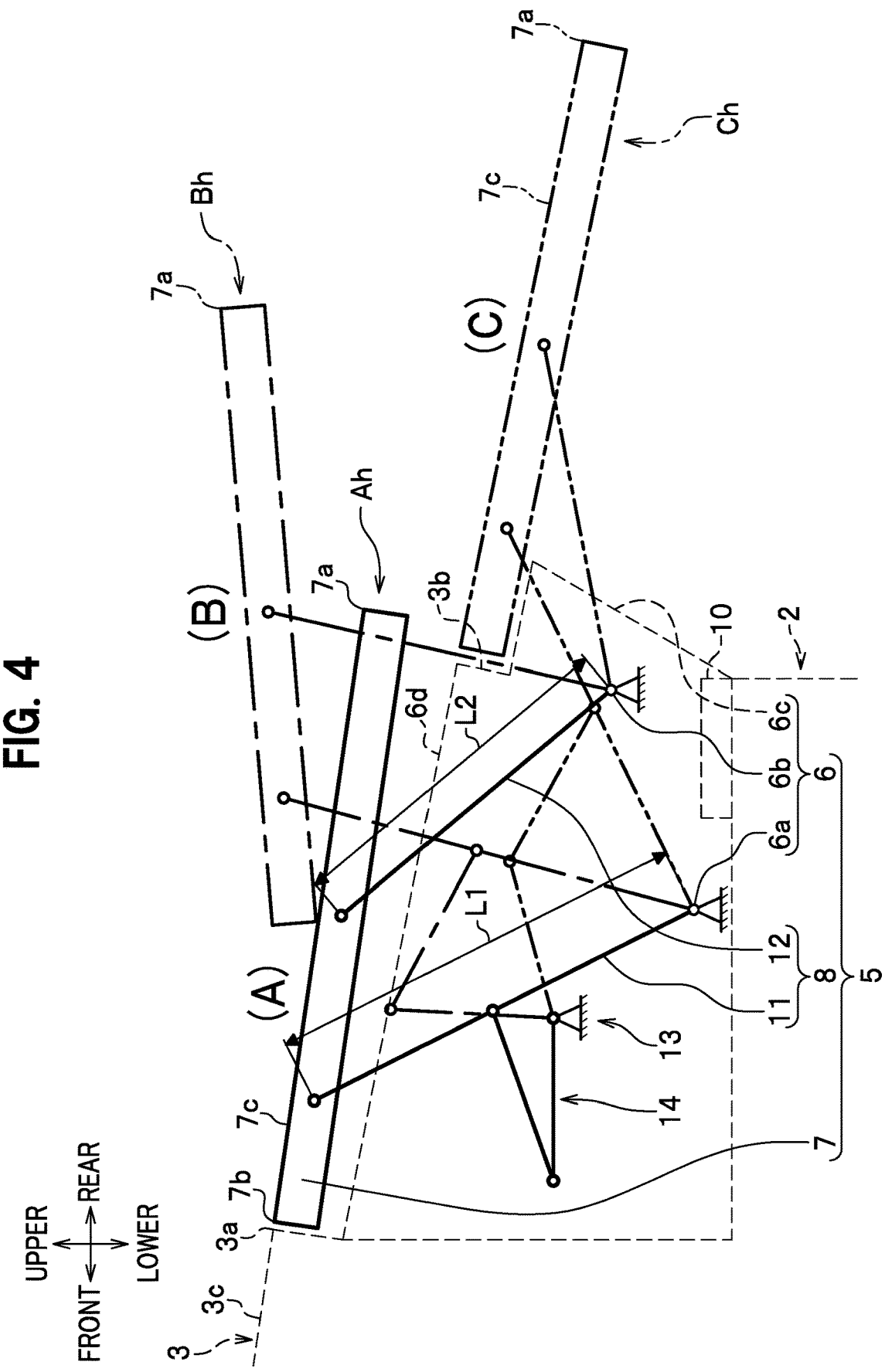
FIG. 4 is a schematic side view of the spoiler structure according to this embodiment, explaining a link mechanism that moves the movable flow adjustment portion from the front position on the vehicle front side to the rear position on the vehicle rear side via the intermediate position.

As illustrated in FIG. 4, the base portion 6 is provided at the rear edge 3a of the roof portion 3 of the vehicle body 2.

The base portion 6 of this embodiment includes a front turn base portion 6a and a rear turn base portion 6b that are provided at the rear edge 3a of the roof portion 3 of the vehicle body 2. The front turn base portion 6a and the rear turn base portion 6b are disposed away from each other. Moreover, the base portion 6 includes a hollow box-shaped case 6c covering the front and rear turn base portions 6a and 6b, and a fixed spoiler 6d provided on an upper surface of the case 6c and having a flat surface that is tilted while extending toward the rear.

The fixed spoiler 6d does not move or change in angle, and is arranged at a position one step lower than the rear edge 3a of the roof portion 3, and is provided at a predetermined tilt angle to be tilted downward while extending toward the rear. A step 3b is provided as a recess at a rear end of the fixed spoiler 6d to be one step lower than an upper surface of the fixed spoiler 6d.

The movable flow adjustment portion 7 has a left-right symmetrical wing shape formed to horizontally elongate in the vehicle width direction. In the movable flow adjustment portion 7, an upper surface 7c is formed on the outer side between a front end 7b and a rear end 7a thereof. The upper surface 7c is formed to be a protrusion-shaped or recess-shaped curved surface alone or together with a lower surface that is located on the opposite side of the upper surface 7c.

As illustrated in FIG. 4, the rear end 7a of the movable flow adjustment portion 7 is moved upward with the movement of the movable flow adjustment portion 7 from the front position (A) to the intermediate position (B). Moreover, the rear end 7a of the movable flow adjustment portion 7 is moved downward with the movement of the movable flow adjustment portion 7 from the intermediate position (B) to the rear position (C).

Furthermore, a height position Ch of the rear end 7a of the movable flow adjustment portion 7 at the rear position (C) is set to be lower than a height position Ah of the rear end 7a of the movable flow adjustment portion 7 at the front position (A).

It should be noted that, in states where the movable flow adjustment portion 7 is arranged at the front position (A) and the rear position (C), the rear end 7a is lower than the front end 7b. In a state where the movable flow adjustment portion 7 is arranged at the intermediate position (B), the rear end 7a is higher than the front end 7b.

In the state where the movable flow adjustment portion 7 is arranged at the rear position (C), the front end 7b is arranged in the step 3b and the upper surface 7c is flush with the upper surface of the fixed spoiler 6d.

The link mechanisms 8 of this embodiment are four-link mechanisms that have one degree of freedom with the vehicle body 2 being a fixation portion, and the pair of left and right link mechanisms 8 are provided. In FIG. 4, one of the link mechanisms 8 is described. Since the other link mechanism 8 is substantially left-right symmetric to the one link mechanism 8, description thereof is omitted.

The link mechanism 8 includes a linear bar-shaped first link 11, a linear bar-shaped second link 12, and a turn actuator 13 that moves the first link 11 and the second link 12. Moreover, the link mechanism 8 includes a turn arm 14 that transmits rotation drive force of the turn actuator 13 to the first link 11.

In this embodiment, the length dimension L1 of the first link 11 is larger than the length dimension L2 of the second link 12.

Moreover, in the turn arm 14, a pair of link rods with substantially the same dimension are linked to each other in a foldable manner. A base end of one of the link rods is linked to a rotation output shaft of the turn actuator 13. Moreover, a distal end of the other link rod is turnably connected to an intermediate position of the first link 11 in a longitudinal direction thereof.

A lower end of the first link 11 is turnably connected to the front turn base portion 6a. An upper end of the first link 11 can thereby swing in the vehicle front-rear direction with a portion where the first link 11 is linked to the front turn base portion 6a being the turning center. The upper end of the first link 11 is turnably connected to a portion in front of an intermediate portion of the movable flow adjustment portion 7 in the front-rear direction.

The rear turn base portion 6b is provided at the rear edge 3a of the roof portion 3 of the vehicle body 2. The rear turn base portion 6b is fixed at a position that is away from the front turn base portion 6a by a predetermined dimension and is on the vehicle rear side of the front turn base portion 6a and that is one step higher than the front turn base portion 6a.

Moreover, a lower end of the second link 12 is turnably connected to the rear turn base portion 6b. An upper end of the second link 12 can thereby swing in the vehicle front-rear direction with a portion where the second link 12 is linked to the rear turn base portion 6b being the turning center. The upper end of the second link 12 is turnably connected to the intermediate portion of the movable flow adjustment portion 7 in the front-rear direction.

The second link 12 is shorter than the first link 11 and the rear turn base portion 6b is arranged above the front turn base portion 6a. Accordingly, at the intermediate position (B), the distal end of the second link 12 is located above the distal end of the first link 11. The movable flow adjustment portion 7 is thereby tilted upward toward the rear end 7a at the intermediate position (B) and downforce can be obtained.

In this embodiment, the turn actuator 13 is provided in at least one of the link mechanisms 8. The turn actuator 13 includes a not-illustrated electric motor, a transmission gear mechanism that drives an output shaft by using rotation drive of the electric motor while reducing speed, the turn arm 14 connected to the output shaft, and the like. The turn arm 14 is turned in one direction (toward the vehicle rear side) by the rotation drive of the electric motor.

Accordingly, the rear end 7a of the movable flow adjustment portion 7 is moved upward (from the height Ah to the height Bh) and then moved downward (from the height Bh to the height Ch) with the movement of the movable flow adjustment portion 7 toward the vehicle rear side from the front position (A) to the rear position (C) via the intermediate position (B).

Since the second link 12 is shorter than the first link 11, a turning angle of the second link 12 is larger than that of the first link 11. Accordingly, at the rear position (C), the distal end of the second link 12 is turned to a position below the distal end of the first link 11. At the rear position (C), the movable flow adjustment portion 7 is thereby tilted such that the rear end 7a is lower than the front end 7b.

The turn arm 14 is also turned in the reverse direction (toward the vehicle front side) by reverse rotation drive of the electric motor.

The movable flow adjustment portion 7 is moved toward the vehicle front side from the rear position (C) to the front position (A) via the intermediate position (B). The rear end 7a is moved upward (from the height Ch to the height Bh) and then moved downward (from the height Bh to the height Ah) with the movement of the movable flow adjustment portion 7.

As described above, the rotation drive force of the turn actuator 13 causes the first link 11 and the second link 12 to swing via the turn arm 14. The link mechanism 8 can thereby move the movable flow adjustment portion 7 to the front position (A), the intermediate position (B), and the rear position (C) in a series of operations by using one turn actuator 13.

As illustrated in FIG. 1, at the front position (A), the movable flow adjustment portion 7 and a step portion located at the rear edge 3a of the roof portion 3 are in contact with each other. In this state, the upper surface 7c of the movable flow adjustment portion 7 is flush with an upper surface 3c of the rear edge 3a of the roof portion 3 and is continuous with the upper surface 3c in the vehicle front-rear direction.

Accordingly, it is possible to achieve a streamline shape smoothly extending from the upper surface 3c of the roof portion 3 and further reduce air resistance.

In this embodiment, as illustrated in FIG. 4, at the front position (A), the movable flow adjustment portion 7 faces and engages with a recess portion on the upper surface of the case 6c of the base portion 6 such that the movable flow adjustment portion 7 extends along the fixed spoiler 6d formed on the upper surface of the case 6c.

Accordingly, a portion protruding upward is reduced and the air resistance is further reduced. Moreover, exterior quality can be improved.

Moreover, the movable flow adjustment portion 7 engages with the recess portion on the upper surface of the case 6c. In this case, at least the front end 7b of the movable flow adjustment portion 7 is in contact with the rear edge 3a of the roof portion 3. This can further improve attachment stability of the movable flow adjustment portion 7 at the front position (A).

Figure 2:
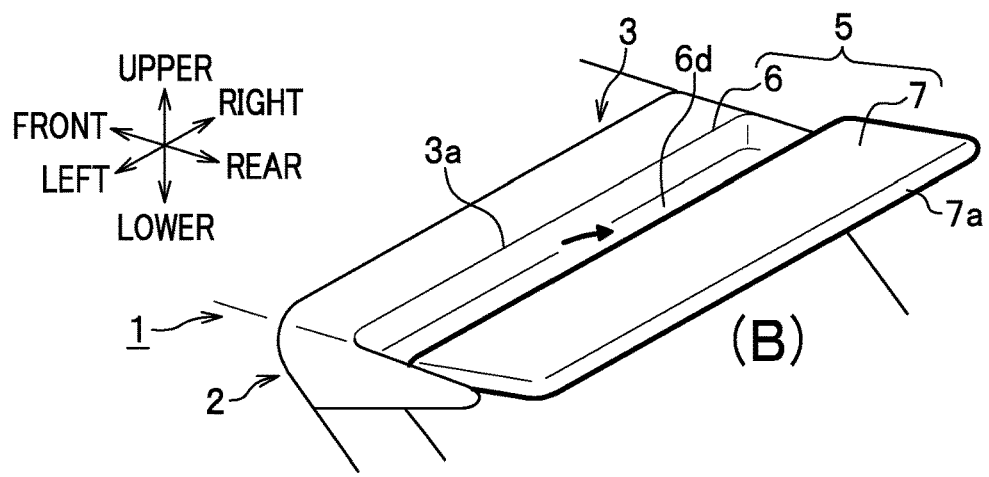
FIG. 2 is a perspective view illustrating a state where the movable flow adjustment portion is at an intermediate position in the spoiler structure according to this embodiment.
Figure 3:
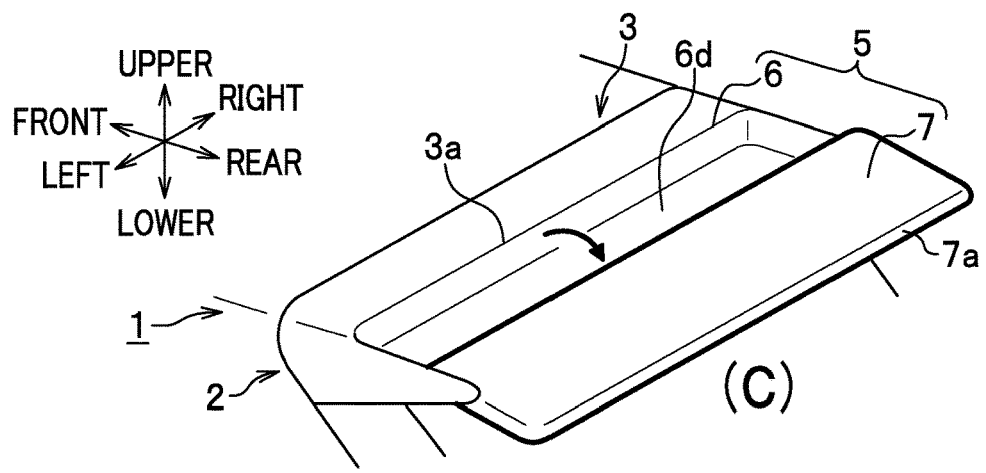
FIG. 3 is a perspective view illustrating a state where the movable flow adjustment portion is at a rear position in the spoiler structure according to this embodiment.

As illustrated in FIG. 2, at the intermediate position (B), the rear end 7a of the movable flow adjustment portion 7 is facing upward. Accordingly, at the intermediate position (B), it is possible to cause air flowing above the upper surface 3c of the roof portion 3 to efficiently hit the movable flow adjustment portion 7 and improve the driving stability.

The movable flow adjustment portion 7 in this embodiment is supported by the pair of left and right link mechanisms 8 and 8, on two first links 11 and two second links 12.

Accordingly, as illustrated at the intermediate position (B) illustrated by one-dot chain lines in FIG. 4, even when the movable flow adjustment portion 7 is moved upward away from the upper surface of the fixed spoiler 6d such that the rear end 7a faces upward, the movable flow adjustment portion 7 can be stably maintained in a desired position.

When the movable flow adjustment portion 7 is at the rear position (C) illustrated by two-dot chain lines, the movable flow adjustment portion 7 engages with the step 3b formed at the rear end of the fixed spoiler 6d and a streamline shape extending from the upper surface of the fixed spoiler 6d to the rear end 7a of the movable flow adjustment portion 7 is formed. This can further reduce the air resistance.

As illustrated in FIG. 4, a lamp body portion 10 is provided in a rear end portion of the case 6c of the base portion 6.

The rear end 7a of the movable flow adjustment portion 7 in this embodiment is arranged above the lamp body portion 10 even in the state where the movable flow adjustment portion 7 is at the rear position (C).

Figure 5:
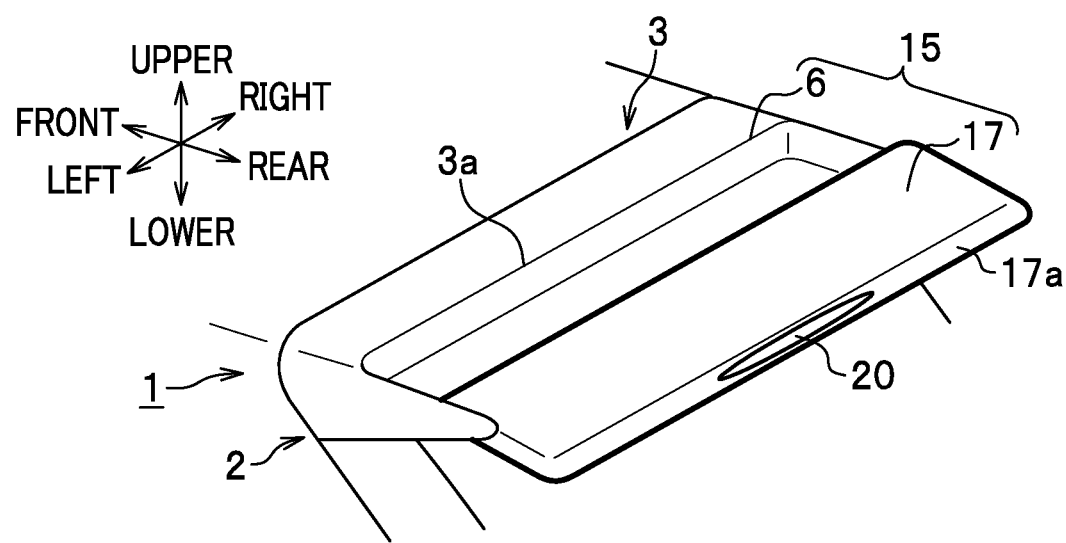
FIG. 5 is a perspective view of a spoiler structure according to a modification of this embodiment, in which a vehicle rear portion includes a rear end lamp body portion at a rear end of the movable flow adjustment portion.

FIG. 5 illustrates a spoiler structure according to a modification of this embodiment. As illustrated in FIG. 5, the spoiler structure in this modified embodiment includes a rear end lamp body portion 20 in an intermediate portion of a rear end 17a of a movable flow adjustment portion 17 in the vehicle width direction.

As described above, the spoiler structure in this modified embodiment includes the base portion 6 attached to the vehicle body 2 and the movable flow adjustment portion 7. The movable flow adjustment portion 7 is moved relative to the base portion 6 from the front position (A) on the vehicle front side to the rear position (C) on the vehicle rear side via the intermediate position (B).

The rear end 7a of the movable flow adjustment portion 7 is moved upward with the movement of the movable flow adjustment portion 7 from the front position (A) to the intermediate position (B).

Moreover, the rear end 7a of the movable flow adjustment portion 7 is moved downward with the movement of the movable flow adjustment portion 7 from the intermediate position (B) to the rear position (C).

The height position Ch of the rear end 7a of the movable flow adjustment portion 7 at the rear position (C) is lower than the height position Ah of the rear end 7a of the movable flow adjustment portion 7 at the front position (A).

In the spoiler structure of this embodiment configured as described above, it is possible to increase the surface area of the spoiler and improve a flow adjustment effect.

To be more specific, as illustrated in FIG. 1, the movable flow adjustment portion 7 can have excellent exterior quality at the front position (A).

Moreover, the movement of the movable flow adjustment portion 7 from the front position (A) toward the vehicle rear side can move the rear end 7a of the movable flow adjustment portion 7 upward and increase the surface area of the spoiler at the intermediate position (B). The flow adjustment effect can be thereby obtained and the driving stability can be improved with downforce.

Moreover, at the rear position (C), the rear end 7a of the movable flow adjustment portion 7 can be moved downward to be located below the position of the rear end 7a of the movable flow adjustment portion 7 at the front position (A). This can reduce the air resistance of the spoiler while increasing the surface area of the spoiler.

As described above, it is possible to improve the drive stability and reduce the air resistance while maintaining a design property.

Moreover, as illustrated in FIG. 4, the movable flow adjustment portion 7 has the link mechanisms 8 between itself and the base portion 6. The link mechanisms 8 move the movable flow adjustment portion 7 to the front position (A), the intermediate position (B), and the rear position (C) in a series of operations.

The link mechanisms 8 can be configured to be movable in a simple structure. Accordingly, it is possible to reduce troubles such as failures and also reduce the manufacturing cost. Moreover, the movable flow adjustment portion 7 requires only one turn actuator 13 such as a motor used to move the movable flow adjustment portion 7. Accordingly, this can also reduce troubles such as failures and reduce the manufacturing cost.

The turning of the link mechanism 8 in one direction moves the rear end 7a of the movable flow adjustment portion 7 upward and then downward with the movement of the movable flow adjustment portion 7 from the front position (A) to the rear position (C) via the intermediate position (B).

As described above, one link mechanism 8 that causes the movable flow adjustment portion 7 to move in the vehicle front-rear direction causes the rear end 7a of the movable flow adjustment portion 7 to turn (perform a circular motion) in the upper-lower direction. Accordingly, the turning of the link mechanism 8 in one direction can achieve the front-rear movement of the entire movable flow adjustment portion 7 and the up-down movement of the rear end 7a of the movable flow adjustment portion 7.

Moreover, the base portion 6 is provided at the rear edge 3a of the roof portion 3 of the vehicle body 2. At the front position (A), the movable flow adjustment portion 7 can adjust air flowing on the roof portion 3. Meanwhile, at the rear position (C), the rear end 7a of the movable flow adjustment portion 7 is facing downward. In this state, the spoiler can have an ideal streamline shape continuous from the roof portion 3. Accordingly, the air resistance can be reduced.

Furthermore, the front end 7b of the movable flow adjustment portion 7 is in contact with the base portion 6 and is continuous with the rear edge 3a of the roof portion 3 of the vehicle body 2 in the vehicle front-rear direction at the front position (A).

Accordingly, when the rear end 7a of the movable flow adjustment portion 7 is facing upward, it is possible to cause air flowing above the roof portion 3 to further efficiently hit the movable flow adjustment portion 7 and improve the driving stability.

Meanwhile, when the rear end 7a of the movable flow adjustment portion 7 is facing downward, the spoiler is made to have a streamline shape extending from the step 3b of the roof portion 3 and the air resistance can be thereby further reduced.

For example, at the rear position (C), as illustrated in FIG. 4, the movable flow adjustment portion 7 engages with the step 3b formed at the rear end of the fixed spoiler 6d and the streamline shape extending from the upper surface of the fixed spoiler 6d to the rear end 7a of the movable flow adjustment portion 7 is formed. This can increase the surface area of the spoiler and further reduce the air resistance.

Moreover, as illustrated in FIG. 4, the base portion 6 includes the lamp body portion 10. At the rear position (C), the movable flow adjustment portion 7 is arranged above the lamp body portion 10.

Accordingly, the lamp body portion 10 does not interfere with the movement of the movable flow adjustment portion 7 even when the lamp body portion 10 is integral with the base portion. Accordingly, the movable range of the movable flow adjustment portion 7 can be increased to achieve a shape that can reduce the air resistance while improving the driving stability.

Furthermore, at the rear position (C), the rear end 7a of the movable flow adjustment portion 7 is arranged above the lamp body portion 10.

Accordingly, at the rear position (C), the visibility of the lamp body portion 10 from behind the vehicle does not decrease even when the rear end 7a of the movable flow adjustment portion 7 is moved downward.

Moreover, as illustrated in FIG. 5, the movable flow adjustment portion 17 includes the rear end lamp body portion 20 in the rear end 17a.

The vehicle 1 according to the modified embodiment of this embodiment is configured such that the rear end lamp body portion 20 is integral with the movable flow adjustment portion 17. Accordingly, the rear end lamp body portion 20 is visible from behind the vehicle even when the rear end 17a of the movable flow adjustment portion 17 is moved in the upper-lower direction.

As described above, the spoiler structure according to this embodiment can increase the surface area of the spoiler and improve the flow adjustment effect. The spoiler structure can thereby exhibit a practically advantageous operational effect of achieving aerodynamic control optimal for a traveling status and an environment of the vehicle 1.

The present invention is not limited to the aforementioned embodiment and various modifications may be made. The aforementioned embodiment is an example given to describe the present invention in an easily understandable manner, and the present invention is not necessarily limited to embodiments including all of the aforementioned configurations. Moreover, some of the configuration in one embodiment may be replaced with configurations in another embodiment and a configuration of one embodiment may be added to configurations of another embodiment. Furthermore, some of the configurations in this embodiment may be deleted or other configurations may be added to or replace the configurations in this embodiment. Possible modifications on the aforementioned embodiment include, for example, the following modifications.

In this embodiment, there are provided the pair of left and right link mechanisms 8 each formed of the four-link mechanism with one degree of freedom with the vehicle body 2 being the fixation portion. However, the link mechanisms 8 are not limited to this particular configuration. For example, one link mechanism 8 may be provided in an intermediate portion in the vehicle width direction. Alternatively, three or more link mechanisms 8 may be provided at intervals in the left-right direction.

Moreover, the turn actuator 13 does not have to be provided in all link mechanisms 8. For example, the turn actuator 13 may be provided in one link mechanism 8. As an alternative, or no turn actuator 13 may be provided.

Although two links including the first link 11 and the second link 12 are provided in each link mechanism 8 according to this embodiment, the link mechanism is not limited particularly to the four-link mechanism. For example, the link mechanism may be formed of one link or by combining three or more links or support bars and the like. The shape, number, and material of members constituting the link mechanism are not limited to particular shape, number, and material.

Moreover, the shape of the movable flow adjustment portion 7 is not limited to that in this embodiment. For example, the shape of the movable flow adjustment portion 7 may have a flat surface or a combined surface formed by combining a flat surface and a curved surface. Moreover, the movable flow adjustment portion 7 may be divided into multiple parts in the vehicle width direction and each of the parts are individually movable in the front-rear direction or the upper-lower direction. Furthermore, the movable flow adjustment portion 7 may be configured such that multiple, for example, two wings are arranged one on top of the other.

Specifically, the rear end 7a of the movable flow adjustment portion 7 is moved upward with the movement of the movable flow adjustment portion 7 from the front position (A) to the intermediate position (B). Moreover, the rear end 7a of the movable flow adjustment portion 7 is moved downward with the movement of the movable flow adjustment portion 7 from the intermediate position (B) to the rear position (C). As long as the spoiler structure can perform such movement, the shape, number, and material of the spoiler structure including the roof portion 3, the rear spoiler 5, the fixed spoiler 6d of the base portion 6, and the movable flow adjustment portion 7 are not particularly limited to those of the spoiler structure in this embodiment.

What is claimed is:

1. A spoiler structure comprising:
   a base portion that is attached to a vehicle body; and
   a movable flow adjustment portion that is moved relative to the base portion from a front position on a vehicle front side to a rear position on a vehicle rear side via an intermediate position, wherein
   a rear end of the movable flow adjustment portion is moved upward with movement of the movable flow adjustment portion from the front position to the intermediate position,
   the rear end of the movable flow adjustment portion is moved downward with movement of the movable flow adjustment portion from the intermediate position to the rear position, and
   a height position of the rear end of the movable flow adjustment portion at the rear position is lower than a height position of the rear end of the movable flow adjustment portion at the front position.

2. The spoiler structure according to claim 1, wherein
the movable flow adjustment portion includes a link mechanism between itself and the base portion, and
the link mechanism moves the movable flow adjustment portion to the front position, the intermediate position and the rear position, in a series of operations.

3. The spoiler structure according to claim 2, wherein the link mechanism is configured such that turning of the link mechanism in one direction moves the rear end of the movable flow adjustment portion upward and then downward with the movement of the movable flow adjustment portion from the front position to the rear position via the intermediate position.

4. The spoiler structure according to claim 1, wherein the base portion is provided at a roof rear edge of the vehicle body.

5. The spoiler structure according to claim 1, wherein a front end of the movable flow adjustment portion is in contact with the base portion and is continuous with a roof rear edge of the vehicle body in a vehicle front-rear direction at the front position.

6. The spoiler structure according to claim 1, wherein
the base portion includes a lamp body portion, and
the movable flow adjustment portion is arranged above the lamp body portion.

7. The spoiler structure according to claim 6, wherein the rear end of the movable flow adjustment portion is arranged above the lamp body portion at the rear position.

8. The spoiler structure according to claim 1, wherein the movable flow adjustment portion includes a rear end lamp body portion at the rear end.

* * * * *